United States Patent [19]

Stamer

[11] 4,108,500
[45] Aug. 22, 1978

[54] PROCESS AND EQUIPMENT FOR EFFECTING SAVINGS IN COMPRESSED GASES DURING INJECTION OF SOLIDS BY MEANS OF PNEUMATIC CONVEYORS

[75] Inventor: Walter Stamer, Hamburg, Germany

[73] Assignee: Claudius Peters AG and Maxpeters Gesellschaft fuer Verfahrenstechnik mbH, Hamburg, Germany

[21] Appl. No.: 719,169

[22] Filed: Aug. 31, 1976

[30] Foreign Application Priority Data

Sep. 1, 1975 [DE] Fed. Rep. of Germany ....... 2538785

[51] Int. Cl.² ............................................. B65G 53/40
[52] U.S. Cl. ........................................ 302/53; 222/56; 222/373
[58] Field of Search ....................... 302/53, 21, 22, 23; 222/373, 56

[56] References Cited

U.S. PATENT DOCUMENTS

| 2,758,747 | 8/1956 | Stevens | 302/53 X |
| 2,956,839 | 10/1960 | Hermanns | 302/53 X |
| 3,762,773 | 10/1973 | Schroeder | 302/53 |
| 3,994,701 | 11/1976 | Schweimanns | 302/53 X |

FOREIGN PATENT DOCUMENTS

| 553,670 | 6/1943 | United Kingdom | 302/55 |
| 995,051 | 6/1965 | United Kingdom | 302/55 |

*Primary Examiner*—Evon C. Blunk
*Assistant Examiner*—James L. Rowland
*Attorney, Agent, or Firm*—Otto John Munz

[57] ABSTRACT

The process and apparatus for effecting savings of compressed injection gases such as oxygen or nitrogen when injecting solids such as burnt lime pneumatically into a receiving vessel, such as the blow-line to steel melt has a solids conveying system, a compressed gas supply source and a conduit and valve system functioning in a sequence, by which the compressed gas upon termination of the procedure is collected and thereupon is recycled. The system is equipped with at least one pressure-reservoir to collect the compressed gas from the previous procedure for recycling it.

The pressure reservoir is subdivided by a reciprocating divider such as a membrane or a reciprocating piston to subdivide it into two parts of variable volumes, the divider is pushed by the returning compressed saved gas from one wall of the reservoir to the other. Highly compressed gas is blown into the empty part of the reservoir to increase the pressure upon the returned gas. The displacement of the divider from one side to the other is effected by a compressor. Additional pressurized gas is supplied independently.

11 Claims, 2 Drawing Figures

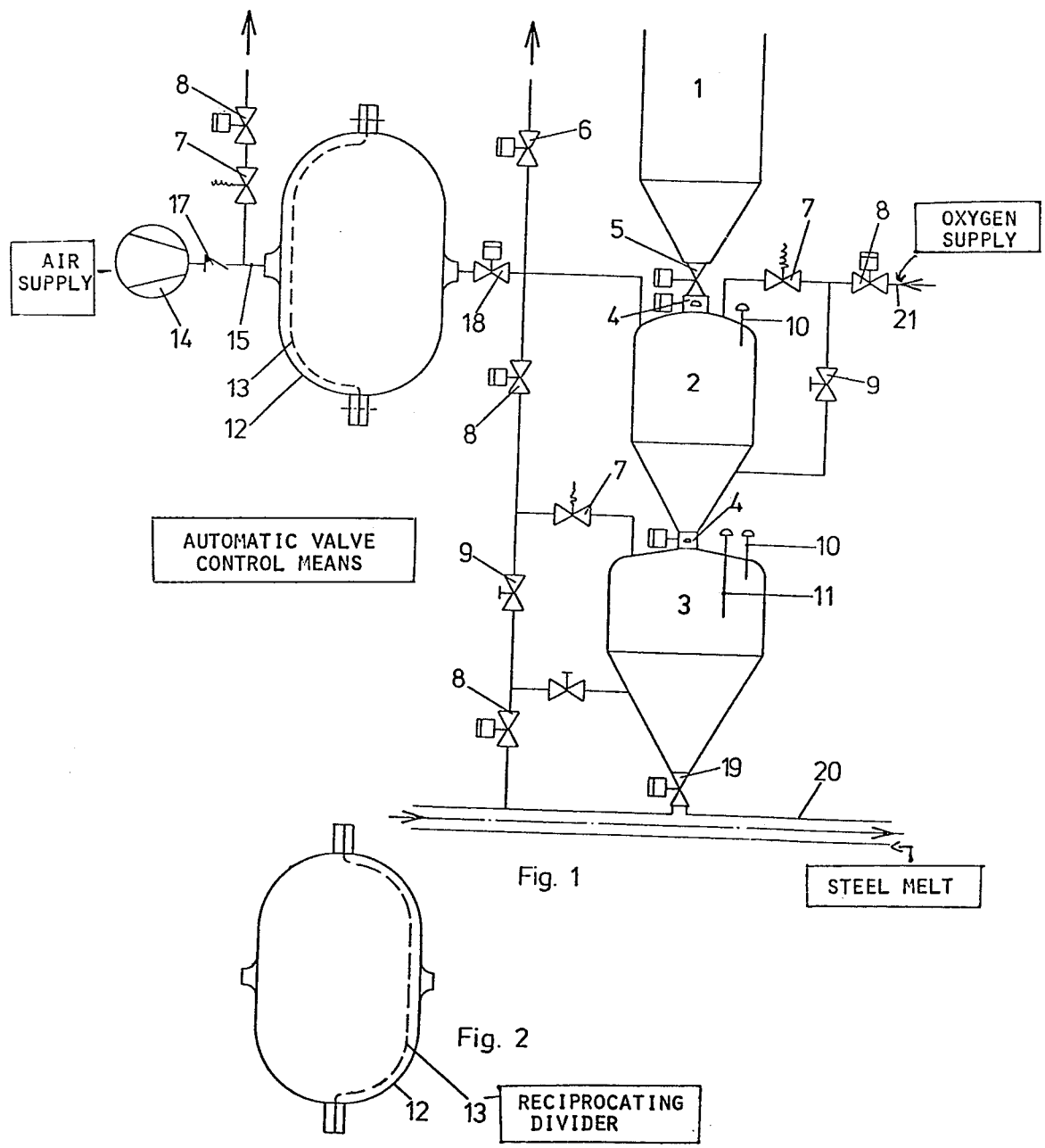

PROCESS AND EQUIPMENT FOR EFFECTING SAVINGS IN COMPRESSED GASES DURING INJECTION OF SOLIDS BY MEANS OF PNEUMATIC CONVEYORS

CROSS-REFERENCE TO A RELATED APPLICATION

Priority of corresponding German Application No. P 25 38 785,3 filed Sept. 1, 1975 is claimed under the convention.

FIELD OF ART

The invention relates to a process for effecting savings in compressed gases when injecting solids into a storage vessel by means of pressure-vessel and to equipment for implementing this process (Class 302-52),

DESCRIPTION OF THE PRIOR ART

The prior art employs single pressure-vessel conveyors in injection equipment to introduce fluxes into a steel melt, such as in LDAC,OLP,OBM,SIP processes, large amounts of fluxes and of gases are required per blow charge when loading large converters, the pressure-vessel conveyor in any event must be designed to hold the maximum amount of fluxes per charge and for instance must be capable of holding up to 40 $M^3$, gas pressures up to 20 bars gauge are used in the blowing process, subsequently to the end of a blow charge, that is, when removing the flux from the pressure-vessel conveyor into the conveyance line to the converter, the compressed gas, which is under high pressure, conventionally is released from the pressure-vessel conveyor through a filter into the ambient, new compressed gas again must be supplied for every subsequent blow charge. The amounts of compressed gas released in such manner are about 800 $M^3 Nm^3$ (STP) for the above cited outputs. Oxygen, which is used as the compressed gas in the above cited process represents a significant operating cost factor to the operator on account of the large amounts used and its high purchase price.

SUMMARY OF THE INVENTION

The primary object of the invention is to provide a process and equipment for effecting savings of compressed gases when blowing solids pneumatically by means of pressure vessel conveyors in order to reduce the loss of compressed gases to a minimum, by eliminating the wasteful release of the compressed gases after the termination of the processing of one batch, and by partly collecting the compressed gases in a compressed gas reservoir, and subsequently feeding these compressed gases in the next procedure.

A preferred equipment for implementing the process of the invention provides at least one compressed-gas reservoir in a compressed-gas vessel conveyor equipment to receive the compressed gases from the preceding cycle and to return them to it. The compressed-gas reservoir comprises a reciprocating divider, preferably in the shape of a membrane subdividing it and A conventional membrane pump of the prior art adapted inventively to the compressed-gas reservoir of the invention for collecting and returning the compressed gases. The invention utilizes broadly also a device known for instance in the shipping of solid and liquid materials in tanker vehicles in which the inside of a container is provided with a flexible bag which upon filling of the container, for instance with oil, moves to the container-inside wall opposite the filling orifice. After emptying the container, another fluid material, solid or liquid, is filled from the opposite side of the container, thus pushing the flexible bag into its initial position toward the inside container-wall. In this manner a tanker-vehicle is equipped for the selective shipping of different materials, obtaining thereby the advantage of a flexible subdivision preventing mutual contact and possible contamination of the materials.

The process and the equipment of the present invention is applicable wherever compressed gases, such as oxygen and nitrogen are required in pressure-vessel conveyors and are of such cost that recycling them is desirable.

When injecting burnt lime with oxygen into the steel melt within the scope of the above cited metallurgical process, the present invention is carried out most advantageously by using a double-story vessel conveying means which has the advantage over a single pressure vessel conveyor means, that, because of a continuous operation, needs not be designed for a maximum possible amount of charge of a converter blowing batch. A continuous operation makes it possible to use a correspondingly more compact pressure vessel conveyor. For instance a first upper container holds about 2/3 of the contents of a second container which preferably is axially vertically aligned underneath the first one. While the lower container is fed batch-wise with solids from the upper container it itself discharges solids continuously during the span of time of a blast charge of the converter. Therefore, during a converter blast charge the lower vessel is constantly under pressure and it may be kept subjected to the compressed gases, such as oxygen, even between two converter batches.

In this application the relatively small upper container is filled with batches of burnt lime from a supply bin preferably vertically superimposed to the two superimposed containers and receives a gauge pressure of oxygen until the pressure in the upper container is equal to that in the blowing lower one. At that moment a pressure balancing valve in the compressed-gas between the upper and lower container opens.

When enough burnt lime has been discharged from the larger lower container to accept the contents of the upper one, the cut-off valve between the upper and the lower containers opens and upon emptying it closes again and the upper container is freed from the oxygen pressure.

At this point according to the invention the conventional venting of oxygen through a filter into the ambient is avoided. Instead, the oxygen is exhausted into a separate pressure reservoir, having a volume which exceeds that of the upper container so that a maximum amount possible of oxygen flows into the reservoir until there is a pressure equilibrium reached between the upper container and the pressure reservoir. The larger the size of the pressure reservoir is selected relative to the size of the upper container, the lesser in proportion is the amount of the residual oxygen, after pressure equilibrium in the upper vessel has been attained, to be vented into the ambient, before burnt lime again is fed into the upper vessel. For a capacity ratio of 1:2 one third, and for a ratio of 1:3 only one fourth of the total amount of the oxygen of the upper container must be blown into the atmosphere.

According to the invention, the pressure reservoir is provided with a flexible membrane subdividing it. When the oxygen is introduced from the upper container this membrane is displaced to the opposite side of the reservoir intake where it rests. Once the upper container has been filled with a new load of burnt lime, the oxygen located in one of the parts of the reservoir, subdivided by the membrane and there subjected to excess pressure, is blown into the upper container. Highly compressed air is blown into the other part of the reservoir in order to increase the pressure. The flexible membrane thereby moves from one side of the reservoir to the other, and the oxygen is displaced. If appropriate, a liquid pressurizing medium may be used to increase the pressure. In lieu of a flexible membrane, the pressure reservoir is provided with a reciprocating piston subdividing it. One or more reservoirs in the shape of cylinders may be used in the alternative with pistons reciprocating within the reservoirs.

In another alternative a piston without a piston rod is employed within the container to be displaced by compressed air for the purpose of pushing the oxygen back into the upper vessel in a manner similar to that employed with the container equipped with the membrane, if oil-free air is used, the inevitable gas exchange between air and oxygen is harmless. In a further alternative the piston is provided with a rod connected for reciprocation to a mechanical drive.

The process and equipment of the invention also are suitable for operation with single pressure vessel conveyors or blow means using twin pressure vessel conveyors.

The process and equipment of the invention complement each other and are mutually interdependent. cl
BRIEF DESCRIPTION OF THE DRAWINGS In the drawings:

FIG. 1 is a flow diagram of a double-story pressure vessel injection apparatus of the invention with a pressure reservoir filled with compressed gas;

FIG. 2 illustrates the pressure reservoir of FIG. 1 when empty.

DESCRIPTION OF THE PREFERRED EMBODIMENT

There are shown on FIG. 1 the basic segments of the apparatus, combined into a novel inventive apparatus, by which a substantial saving in the volume of compressed gas is accomplished.

A. A conveyor means, comprises a fluid flux material supply bin 1, a first or upper container 2 and a second or lower container 3.

B. A pressurized oxygen-gas reservoir 12, a divider 13, a compressor 14 and divider moving means 15.

C. Conduits between the conveyor section and the pressurized gas reservoir providing connections between the various parts.

D. A valve system controlling the conduits and regulating the changing sequence of the plurality of steps of the process, correlated with the design of the apparatus.

E. Auxiliary oxygen-gas supply means 21.

The bin 1 or other type supply means of fluid solids such as burnt lime and the first and the second containers are shown in the preferred embodiment in vertical axial alignment with spigot type bottoms aiding the flow of the flux by gravity. As a two-story conveyor.

The supply bin is provided at its bottom with closure means 5 with means to control the openings and closing of them manually or automatically, the first container 2 at its top, opposite to the bin closure means and at its bottom has bell valves 4, also with manually or automatically operable controls thus providing conduit connections to the bottom of the bin and the top of the second container.

As shown in FIG. 1 the second container 3 has a substantially larger volume than the first container 2. The gas reservoir again is substantially larger than the supply bin.

The second container 3 with its bottom ends in a metering device 19, providing conduit connection to the blow line 20 directed toward the steel melt.

The first container is filled from the supply bin in batches, in response to an indicator 10 of the first container. The first container after filling is charged with a gauge pressure of oxygen from the oxygen supply reservoir 12 via the conduits and valve system as shown on FIG. 1.

The second container which may have a continuous discharge operation is continuously under a gauge charge and the valve system provides for equalization of the pressures in the first and second containers for which purpose a pressure balancing valve 9 between the first and second containers opens.

An empty state indicator 11 is provided for the lower container. When enough burnt lime has been removed from its lower vessel via metering device 19 into blow line 20, so that the level in the lower container drops to the empty state of the empty bin-state indicator 11 bell-valve 4 located between the two containers opens and the contents of the upper container are delivered to the lower container. After the upper container has been emptied into the lower one, bell-valve 4 is closed again and thereupon the upper container is decompressed from the oxygen load.

The pressurized oxygen passes to pressure gas reservoir 12, which is subdivided by a reciprocable divider, shown as a membrane 13. As already mentioned a piston, with or without a piston rod is an equivalent thereto.

An equilibrium valve 18 is closed after equilibrium is reached between the pressures in the upper vessel and the pressure-reservoir, and a degassing valve 6 is opened, so that the remainder of oxygen in the upper vessel flows through a filter into the ambient, upon refilling the upper vessel with burnt lime, oxygen from the pressure reservoir is blown into the upper vessel. To increase the pressure, highly compressed air is supplied through air supply line or moving means 15 from a compressor 14 to the pressure reservoir, so as to displace the membrane from one side to the other and thus to move the oxygen. The air pressure must be higher than that of the saved oxygen in reservoir 12 in order to exert pressure thereupon.

By properly selecting the volume relationships in this manner no new or very little additional oxygen is required for the full-build-up of pressure of the upper vessel filled with burnt lime. Any additional oxygen that might be required is being supplied through line 21.

Safety valves 7, remote-controlled valves 8, manually actuated valves 9, a back pressure valve 17 and a correlation circuitry (not shown) between the level indicators and valves preferably for fully automatic processing controls of a continuous operation are provided. It is within the scope of the invention to eliminate the first container, and impart its function to the supply bin itself.

Approximate sequences and interrelations of means and steps, and details may be added, deleted and/or changed without affecting the scope of the invention as claimed.

What is claimed is:

1. A process of saving gas in the pneumatic injection of particulate solids into a blow line connected with a second container pressurized with the gas, comprising the steps of:

charging the solids in discrete batches into a first pressurizable container:

pressurizing the first container from a reservoir of the compressed gas, while a previous batch of said solids is being injected into the blow line from the second container:

charging the batch of pressurized solids in first container into the second container by connecting the containers to equalize the pressure therebetween, while solids in the second container are being continuously discharged under pressure into the blow line:

cutting off connection between the containers on completion of discharge of an accumulated batch of solids from the first to the second container and subsequently connecting the first container with the reservoir to pass gas thereto for subsequently pressurizing the first container.

2. The process as claimed in claim 1, further comprising the step of:

charging make-up gas under pressure to the first container, while it is under pressure, from a source independent of the reservoir, to increase the pressure in the first container to at least equal that in the second container.

3. An apparatus for pneumatically injecting particulate solids into a blow line, comprising; first and second superposed pressurizable containers for said solids; a supply source for said solids disposed over and above said containers, a first conduit having a first valve therein, connecting said supply source and said first container, a second conduit having a second valve therein and connecting the base of said second container to said blow line, a pressurizable gas reservoir; a divider dividing said reservoir into first and second discrete chambers of reciprocally varying first and second volumes; a third conduit having a third valve therein and connecting said first container and the second chamber of said reservoir, said divider being operable to impel flow of gas from the second chamber of said reservoir, into said first container, by and in response to increase in pressure and volume of said first chamber, and to enable flow of gas from said first container to said second chamber for conservation therein, by and in response to release of pressure and corresponding decrease in volume of said first chamber; and a fourth conduit having a fourth valve therein and connecting the base of said first container and the top of said second container, to afford gravity flow of particulate solids therebetween.

4. The apparatus as claimed in claim 3, said divider comprising a flexible diaphragm, and pressurized air means connected with the first chamber of said reservoir and operable to move said divider, to thereby vary the volume of said second chamber, to impel gas to said first container, to and from the second chamber of said reservoir.

5. The process of continuously charging particulate solids into a flow line, comprising:

establishing connection between a supply source and a first container to effect gravitational flow of solids as a first batch, from the source to the first container, at ambient pressure:

closing off connection between the supply source and first container on accumulation of a first batch of particulate solids therein:

connecting the first container to a reservoir of pressurized gas, to elevate the pressure therein to above atmospheric;

effecting flow of solids from the first container to a second container disposed beneath the first container, by opening a conduit between them, while continuously charging solids from the second container to the flow line;

closing off the conduit on exhaustion of material flowing from the first container;

connecting the first container to the reservoir to effect return flow of gas thereto;

closing off communication between the first container and reservoir on equalization of pressure between them;

connecting the first container to atmosphere on equalization of pressure between the first container and reservoir;

re-establishing connection between the supply source and first container to effect flow of a second batch to the first container;

closing off connection between the supply source and first container on accumulation of the second batch therein;

re-connecting the reservoir to the first container to effect return flow of gas thereto;

supplying make-up gas to the first container by connecting the same with a pressurized source independent from the reservoir, to elevate the pressure in the first container to a value at least equal to that in the second container;

thereafter closing the connection between the independent source and the first container; and re-establishing connection between the containers to effect flow of the second batch in the first container, to the second container.

6. The process of claim 5, and cutting off connection between the reservoir and first container, prior to supplying make-up gas to the latter.

7. The process of claim 6, and cutting off connection between the reservoir and first container just prior to opening the conduit between containers.

8. The process of claim 7, said particulate material being burnt lime, said gas being oxygen, said flow line conveying the particulate material to a steel melt.

9. In an apparatus for continuously feeding particulate material under superatmospheric pressure, to a flow line;

first and second superposed containers;

a first valved conduit connecting the base of said first container and the top of said second container;

a second valved conduit connecting the base of said second container and flow line;

a supply bin elevated above said containers;

a third valved conduit connecting said supply bin and first container;

a pressurizable reservoir;

divider means in said reservoir to form therein, first and second chambers of reciprocally varying volumes;

a fourth valved conduit connecting the second chamber of said reservoir, with said first container;

a source of compressed gas; and a fifth valved conduit connecting said source and first chamber of said reservoir.

10. The apparatus of claim 9, a source of pressurized gas independent of said reservoir; and a sixth valved conduit connecting said source and first container.

11. The apparatus of claim 9, and a seventh valved conduit connecting said first container to atmosphere.

* * * * *